United States Patent
Leparmentier et al.

(10) Patent No.: US 6,400,798 B1
(45) Date of Patent: Jun. 4, 2002

(54) SIMPLE MEANS FOR MEASURING THE OFFSET INDUCED BY PHOTO-CONDUCTIVE FETS IN A SOLID STATE X-RAY DETECTOR

(75) Inventors: Richard Leparmentier, Sherwood; Scott Petrick, Sussex; John Boudry, Waukesha, all of WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/629,694

(22) Filed: Aug. 1, 2000

(51) Int. Cl.[7] .................................................. H05G 1/64
(52) U.S. Cl. ........................ 378/98.8; 348/362; 348/364
(58) Field of Search .............................. 378/98.8, 98.9, 378/98.7, 207; 348/362, 364, 296, 297, 320

(56) References Cited

U.S. PATENT DOCUMENTS

| | | | |
|---|---|---|---|
| 5,657,400 A | * | 8/1997 | Granfors et al. ............. 382/254 |
| 6,115,451 A | * | 9/2000 | Boudry et al. ............. 378/98.8 |
| 6,252,217 B1 | * | 6/2001 | Pyyhtia et al. ........... 250/208.1 |
| 6,255,638 B1 | * | 7/2001 | Eraluoto et al. ......... 250/208.1 |
| 6,266,391 B1 | * | 7/2001 | Albagli ...................... 378/98.2 |

* cited by examiner

Primary Examiner—David V. Bruce
Assistant Examiner—Irakli Kiknadze
(74) Attorney, Agent, or Firm—McAndrews, Held & Malloy, Ltd.; Peter J. Vogel; Michael A. Dellapenna

(57) ABSTRACT

A preferred embodiment of the present invention provides a method and apparatus for correcting the offset induced by Field Effect Transistor (FET) photo-conductive effects in a solid state X-ray detector. The method and apparatus include reading out twice as many rows (scan lines) as actually exist in the X-ray detector. The additional rows may be read out between the actuation of "real" scan lines on the X-ray detector. The additional row times may be used to measure the "signal" induced by FET photo-conductivity. In a preferred embodiment, the "real" rows may be actuated during odd lines, and even lines will be used to measure the signal induced by FET photo-conductivity. To correct for the offset induced by photo-conductive FETs, an even row signal may be subtracted from the preceding odd row signal. The correction for the offset induced by photo-conductive FETs may occur in addition to normal offset correction.

27 Claims, 3 Drawing Sheets

SIMPLE MEANS FOR MEASURING THE OFFSET INDUCED BY PHOTO-CONDUCTIVE FETS IN A SOLID STATE X-RAY DETECTOR

CROSS REFERENCE TO RELATED APPLICATIONS (IF APPLICABLE)

Not applicable.

STATEMENT REGARDING FEDERALLY SPONSORED RESEARCH & DEVELOPMENT (IF APPLICABLE)

Not Applicable.

BACKGROUND OF THE INVENTION

The present invention generally relates to medical diagnostic imaging systems, and in particular relates to a method and apparatus for correcting the image offset induced by Field Effect Transistor (FET) photo-conductive effects in medical imaging systems employing solid state detectors.

X-ray imaging has long been an accepted medical diagnostic tool. X-ray imaging systems are commonly used to capture, as examples, thoracic, cervical, spinal, cranial, and abdominal images that often include information necessary for a doctor to make an accurate diagnosis. X-ray imaging systems typically include an x-ray source and an x-ray sensor. When having a thoracic x-ray image taken, for example, a patient stands with his or her chest against the x-ray sensor as an x-ray technologist positions the x-ray sensor and the x-ray source at an appropriate height. X-rays produced by the source travel through the patient's chest, and the x-ray sensor then detects the x-ray energy generated by the source and attenuated to various degrees by different parts of the body. An associated control system obtains the detected x-ray energy from the x-ray sensor and prepares a corresponding diagnostic image on a display.

The x-ray sensor may be a conventional screen/film configuration, in which the screen converts the x-rays to light that exposes the film. The x-ray sensor may also be a solid state digital image detector. Digital detectors afford a significantly greater dynamic range than conventional screen/film configurations, typically as much as two to three times greater.

One embodiment of a solid state digital x-ray detector may be comprised of a panel of semiconductor FETs and photodiodes. The FETs and photodiodes in the panel are typically arranged in rows (scan lines) and columns (data lines). A FET controller controls the order in which the FETs are turned on and off. The FETs are typically turned on, or activated, in rows. When the FETs are turned on, charge to establish the FET channel is drawn into the FET from both the source and the drain of the transistor. The source of each FET is connected to a photodiode. The drain of each FET is connected to readout electronics via data lines. Each photodiode integrates the light signal and discharges energy in proportion to the x-rays absorbed by the detector. The gates of the FETs are connected to the FET controller. The FET controller allows signals discharged from the panel of photodiodes to be read in an orderly fashion. The readout electronics convert the signals discharged from photodiodes. The energy discharged by the photodiodes in the detector and converted by the readout electronics is used by an acquisition system to activate pixels in the displayed digital diagnostic image. The panel of FETs and photodiodes is typically scanned by row. The corresponding pixels in the digital diagnostic image are typically activated in rows.

The FETs in the x-ray detector act as switches to control the charging and discharging of the photodiodes. When a FET is open, an associated photodiode is isolated from the readout electronics and is discharged during an x-ray exposure. When the FET is closed, the photodiode is recharged to an initial charge by the readout electronics. Light is emitted by a scintillator in response to x-rays absorbed from the source. The photodiodes sense the emitted light and are partially discharged. Thus, while the FETs are open, the photodiodes retain a charge representative of the x-ray dose. When a FET is closed, a desired voltage across the photodiode is restored. The measured charge amount to re-establish the desired voltage becomes a measure of the x-ray dose integrated by the photodiode during the length of the x-ray exposure.

X-ray images may be used for many purposes. For instance, internal defects in a target object may be detected. Additionally, changes in internal structure or alignment may be determined. Furthermore, the image may show the presence or absence of objects in the target. The information gained from x-ray imaging has applications in many fields, including medicine and manufacturing.

In any imaging system, x-ray or otherwise, image quality is of primary importance. In this regard, x-ray imaging systems that use digital or solid state image detectors ("digital x-ray systems") face certain unique difficulties. Difficulties in an digital x-ray image could include image artifacts, "ghost images," or distortions in the digital x-ray image. One source of difficulty faced by digital x-ray systems is the photo-conductive characteristics of semiconductor devices used in the digital x-ray systems.

Photo-conductivity is an increase in electron conductivity of a material through optical (light) excitation of electrons in the material. Photo-conductive characteristics are exhibited by the FETs used as switches in solid state x-ray detectors. Ideally, FET switches isolate the photodiode from the electronics which restore the charge to and measure the charge upon the photodiode. FETs exhibiting photo-conductive characteristics do not completely isolate the photodiode from the system, when the FETs are open. Consequently, the FETs transfer excess charge to the readout electronics. If the FETs transfer excess charge to the readout electronics, the energy subsequently discharged from the photodiodes to activate the pixels in the digital image may be affected. The unintended charge leakage through the FETs may produce artifacts or may add a non-uniform offset value to each of the pixels in the digital x-ray image, thus producing a line artifact in the image.

FETs and other materials made of amorphous silicon also exhibit a characteristic referred to as charge retention. Charge retention is a structured phenomenon and may be controlled to a certain extent. Charge retention corresponds to the phenomenon whereby not all of the charge drawn into the FET to establish a conducting channel is forced out when the FET is turned off. The retained charge leaks out of the FET over time, even after the FET is turned off, and the leaked charge from the FET adds an offset to the signal read out of the photodiodes by the x-ray control system.

The FETs in the x-ray detector exhibit charge retention characteristics when voltage is applied to the gates of the FETs to read the rows of the x-ray detector. The detector rows are generally read in a predetermined manner, sequence, and time interval. The time interval may vary between read operations for complete frames of the x-ray image. When a FET is opened after the charge on an associated photodiode is read by a charge measurement unit, the FET retains a portion of the charge. Between read operations, the charge retained by the FETs leaks from the FETs to a charge measurement unit. The amount of charge that leaks from the FETs exponentially decays over time. The next read operation occurs before the entire retention charge leaks from the FETs. Consequently, the charge measurement unit measures during each read operation an amount of charge that was stored by the FETs during the previous read operation. The charge measurement unit also reads an amount of charge that was stored by FETs that were activated in scan lines preceeding the current scan line in the current read operation.

The charge remaining on the FETs when a new read operation is initiated is referred to as the initial charge retention. The initial charge retention stored on multiple FETs, such as the FETs of a single data line, combines to form a charge retention offset for that column. The charge retention offset varies based on the rate at which rows of the x-ray detector panel are read. As the interval increases between read operations, the charge decay increases. As the panel rows are read, the charge retention offset builds to a steady state value. The steady state value for the charge retention rate represents the point at which the panel rows are read at a rate equaling the exponential decay rate of the charge on the FETs.

If the times between frames for both the offset and x-ray image are consistent, the effect of charge retention may be eliminated from the final image. In the normal process of reading a detector, the effect of retained charge may be minimized by simply subtracting the results of a "dark" scan from the results of an "exposed" scan. A "dark" scan is a reading done without x-ray. A "dark" scan simply activates the FETs on the x-ray detector panel. Thus, a "dark" scan may determine the charge retention characteristics exhibited by the FETs activated to read the x-ray detector. By subtracting the "dark" scan from the actual "exposed" scan of a desired object, the charge retention effects may be eliminated.

During an x-ray exposure, a similar phenomenon occurs whereby charge is generated in the FET as a result of the FET photo-conductive characteristics. When the FETs are turned off at the end of the exposure, the additional charge also leaks out and adds to the read signal in a manner analogous to charge retention. However, the additional charge cannot be removed because the additional charge resulting from the FET photo-conductive characteristics relates to the x-rays bombarding the x-ray detector. Thus, the additional charge resulting from the FET photo-conductive characteristics is not predictable or nor is it reproducible in a "dark" image where no x-rays are transmitted. The number of FETs that photo-conduct and the amount of charge conducted by the FETs are dependent upon the amount of x-ray exposure and the object imaged, as well as upon the individual properties of each FET. Since a solid state x-ray detector is structured along rows (scan lines) and columns (data lines), the excess charge in the FETs may result in structured image artifacts or offsets which cannot be corrected by contrasting the "exposed" image with a "dark" image.

Photo-conductivity is not as structured as charge retention. First, when a FET in the x-ray detector is turned on to be read, the FET is always turned on with the same voltage. With the photo-conductive effect, the "amount" that the FET is turned on is determined by the intensity of the light reaching a given FET. The light reaching the FETs may vary among a wide range of intensities for all of the FETs on the x-ray detector. Second, regardless of how strongly each FET is affected by photo-conductivity (due to the light intensity at each FET), all of the FETs will be affected simultaneously. Charge retention induced by reading only stimulates one FET in any given column at a time. Therefore, photo-conductivity is much more unpredictable and is uncorrectable by a simple image subtraction method.

As noted above, the characteristics of digital image detectors inherently vary. Although there is a need to provide consistent and accurate image quality (and in particular, image resolution) within and across multiple medical diagnostic imaging systems, in the past there has been no automated technique for providing such consistency.

Thus, a need exists for a method and apparatus for correcting the offset induced by Field Effect Transistor photo-conductive effects in a solid state x-ray detector.

BRIEF SUMMARY OF THE INVENTION

A preferred embodiment of the present invention provides a method and apparatus for correcting the offset induced by Field Effect Transistor (FET) photo-conductive effects in a solid state X-ray detector. The method and apparatus include reading out twice as many rows (scan lines) as actually exist in the X-ray detector. The additional rows may be read out between the actuation of "real" scan lines on the X-ray detector. The additional row readings may be used to measure the "signal" induced by FET photo-conductivity. In a preferred embodiment, the "real" rows may be read out during odd numbered scan lines, and even number scan lines will be used to measure the signal induced by FET photo-conductivity. To correct for the offset induced by photo-conductive FETs, an even row signal may be subtracted from the preceding odd row signal. The correction for the offset induced by photo-conductive FETs may occur after normal offset correction. In effect, the actual signal contribution from FET photo-conductivity can be measured independently on each column, for each row, and subtracted.

DETAILED DESCRIPTION OF THE INVENTION

Figure 1:
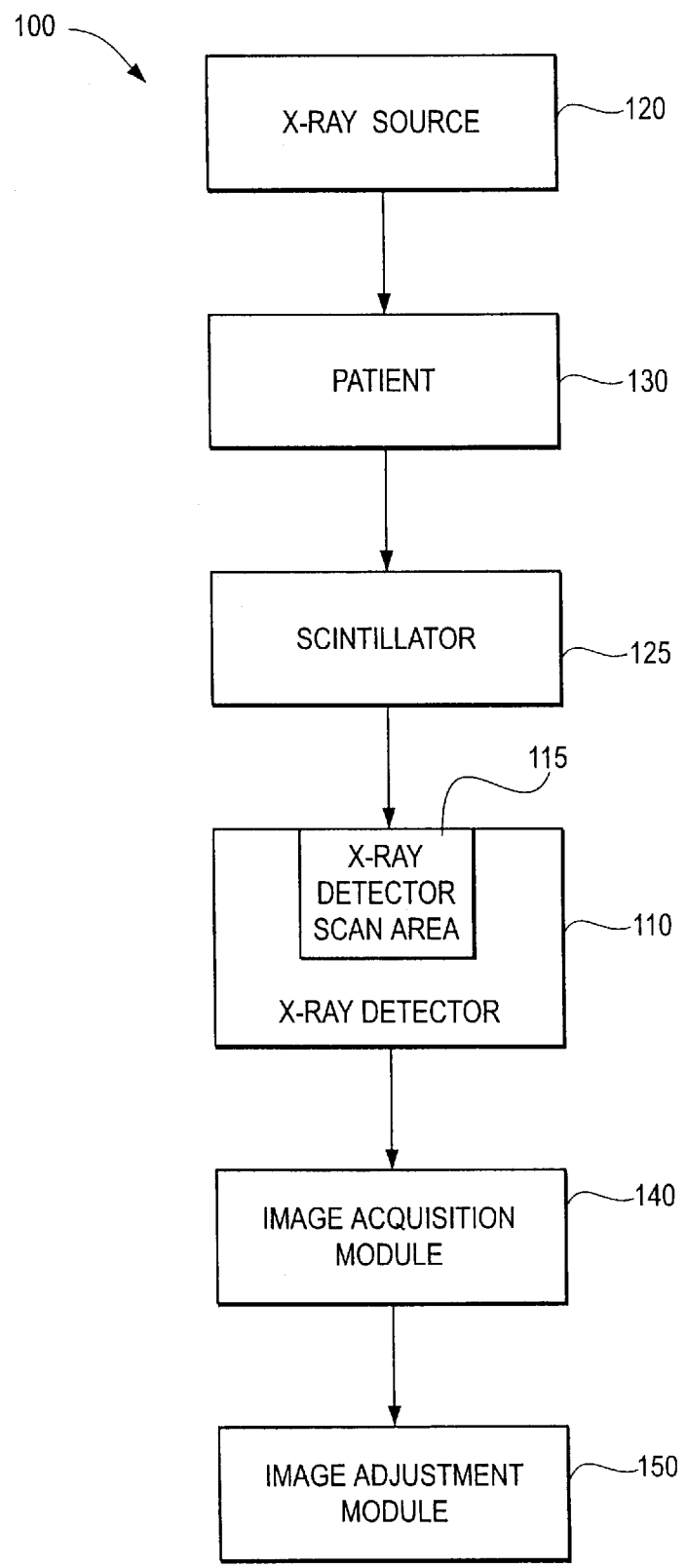
FIG. 1 illustrates a preferred embodiment of a general medical diagnostic imaging system used in connection with the present invention.

FIG. 1 illustrates a preferred embodiment of a medical diagnostic imaging system 100 used in accordance with the present invention. The medical diagnostic imaging system 100 includes a plurality of subsystems. For the purposes of illustration only, the medical diagnostic imaging system is described as an x-ray system. The medical diagnostic imaging system 100 includes subsystems, such as an x-ray detector 110, an x-ray detector scan area 115, an x-ray source 120, a scintillator 125, and a patient 130. The medical diagnostic imaging system 100 also includes an image acquisition module 140 and an image adjustment module 150.

The patient 130 is positioned in the medical diagnostic imaging system 100. In one exemplary system, an x-ray source 120 is positioned below the patient 130. The x-ray detector 110 is positioned above the patient 130. The scintillator 125 is positioned between the x-ray detector 110 and the patient 130. X-rays are transmitted from the x-ray source 120 through the patient 130 to the scintillator 125. The scintillator 125 emits light in response to the x-rays transmitted from the x-ray source 120 through the patient 130. The emitted light is transmitted to the x-ray detector 110 and the x-ray detector scan area 115.

Figure 3:
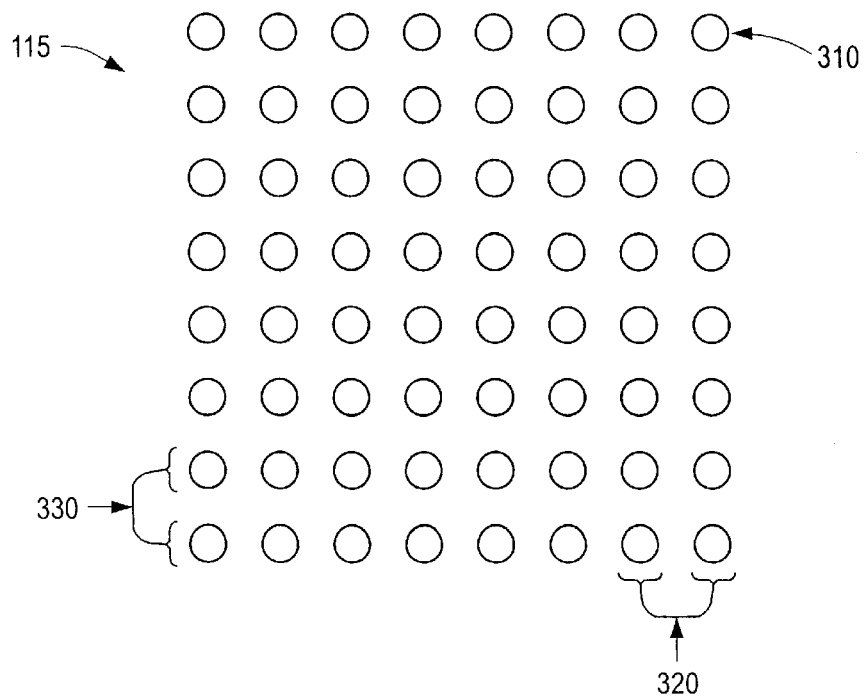
FIG. 3 illustrates a preferred embodiment of a solid state x-ray detector.

FIG. 3 illustrates a preferred embodiment of a solid state x-ray detector scan area 115 within an x-ray detector 110. The x-ray detector scan area 115 is comprised of cells 310 corresponding to pixels in an x-ray image. The cells 310 may be arranged in columns (data lines) 320 and rows (scan lines) 330. Activation of the pixels in cells 310 is done by row 330. The pixels are activated and the signals from pixels on rows 330 are read via columns 320 and converted to produce the desired digital x-ray image of the patient 130.

Figure 5:
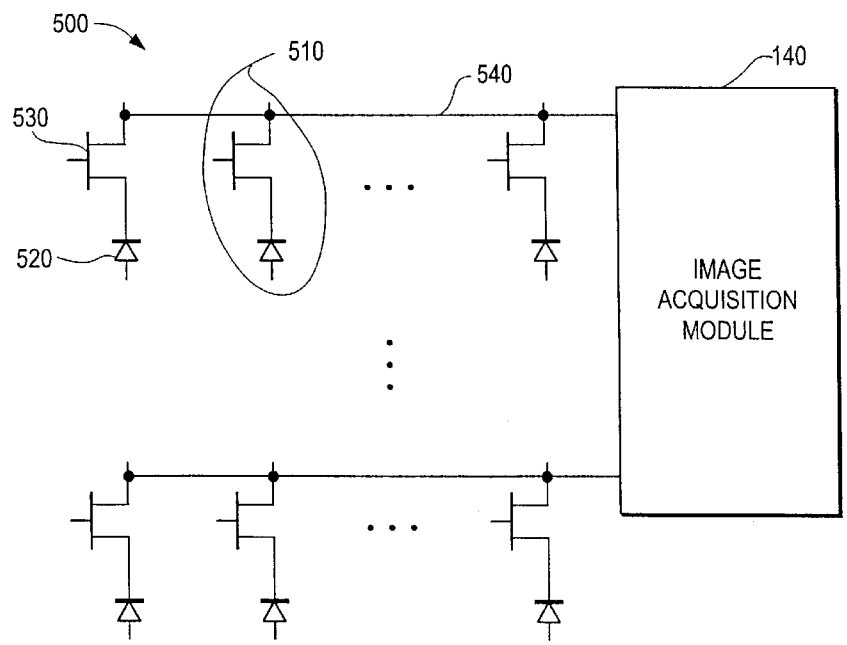
FIG. 5 illustrates a preferred embodiment of a solid state x-ray detector.

FIG. 5 illustrates a lower-level view of a preferred embodiment of a solid state x-ray detector scan area 115 within an x-ray detector 110. The x-ray detector scan area 115 is comprised of cells 510 comprising a photodiode 520 and a Field Effect Transistor (FET) 530. Leads 540 connect the cells 510 to the image acquisition module 140.

The image acquisition module 140 acquires an x-ray image from the x-ray detector scan area 115. In a preferred embodiment, the image acquisition module 140 scans a "real" row 330 existing in the x-ray detector scan area 115 and acquires data from that row 330. The data is acquired from the "real" row 330 by allowing the FETs to conduct. The next line "scanned", an "even" scan, re-measures the data line 320 to determine charge leakage from FET photo-conductivity. The data is acquired from the "even" scan without allowing the FETs to conduct. On the next scan, an "odd" scan, another "real" row 330 is read out. The odd and even scanning process continues until the x-ray detector scan area 115 has been read out.

The image acquisition module 140 may acquire an x-ray image from the x-ray detector scan area 115 by receiving a signal from the leads 540 from the cells 310, 510 in the x-ray detector scan area 115. The signal from the leads 540 may be generated by charge stored in the photodiodes 520. The charge stored in the photodiodes 520 may result from absorption of light by the photodiodes 520. The light is emitted by the scintillator 125 directly above the photodiodes 520 in response to absorption of x-ray energy by the scintillator 125. The FETs 530 allow the charge stored in the photodiodes 520 to travel as a signal through the leads 540. The FETs 530 may be actuated by the image acquisition module 140. The signal received by the image acquisition module 140 may include an offset produced by the charge retention characteristics and photo-conductive effects of the FETs 530.

The image adjustment module 150 receives the acquired image from the image acquisition module 140. The image adjustment module 150 corrects the offset induced in the image by the x-ray detector 110. The offset in the x-ray image may be induced by the photo-conductive and/or charge retention properties of the FETs (Field Effect Transistors) in the x-ray detector 110. In a preferred embodiment, the charge retention offset from the FETs 530 may be eliminated by subtracting a "dark" image containing the charge leakage caused by charge retention in the FETs. In a preferred embodiment, the additional rows scanned between each row 330 of the x-ray detector scan area 115 are utilized by the image adjustment module 150 to correct the offset induced by FET photo-conductive effects in the x-ray image.

Figure 2:
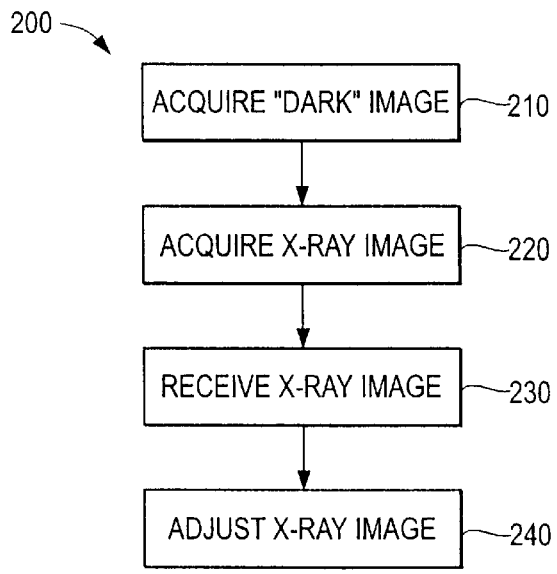
FIG. 2 illustrates a flow diagram for a preferred embodiment of correcting the offset induced by Field Effect Transistor (FET) photo-conductive effects in a solid state x-ray detector.

FIG. 2 illustrates a flow diagram 200 for a preferred embodiment for correcting the offset induced in a medical diagnostic imaging system according to the present invention. In step 210, the image acquisition module 140 acquires a "dark" image from the x-ray detector scan area 115. A "dark" image is obtained from a reading taken without x-rays. A scan for a "dark" image activates the FETs 530 in the x-ray detector scan area 115 and measures retained charge leakage from the FETs 530. Thus, a "dark" image may be used to determine the charge retention offset produced by the FETs 530 activated to read the x-ray detector scan area 115.

Figure 4:
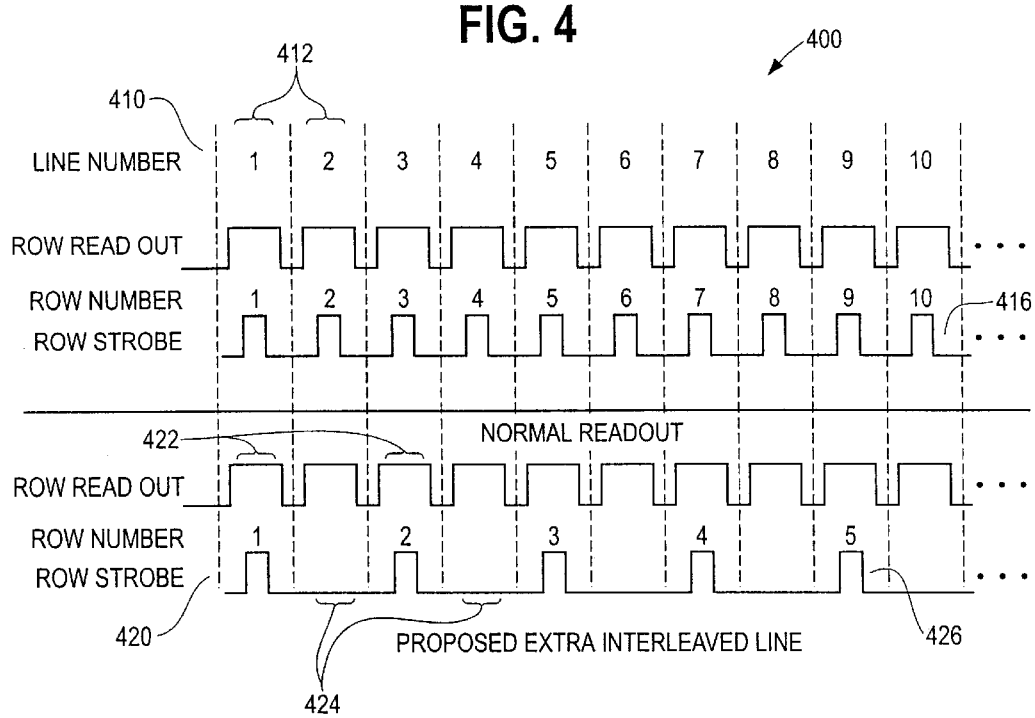
FIG. 4 shows a wave diagram demonstrating a method of acquiring an image according to a preferred embodiment of the present invention.

In step 220, the image acquisition module 140 acquires an x-ray image from the x-ray detector scan area 115. The image is offset by excess charge from sources such as the photo-conductive effects and charge retention characteristics of FETs 530 comprising the solid state x-ray detector 110. The x-ray image is read row by row by the image acquisition module 140 from the x-ray detector scan area 115 using leads 540 from cells 510 in the x-ray detector scan area 115. In a preferred embodiment, the image acquisition module 140 scans a "real" row 330 existing in the x-ray detector scan area 115 and acquires exposure data from that row 330. During the "real" scan, the FETs are allowed to conduct. The next line scanned, an "even" scan, re-measures the data line 320 to determine the offset from FET photo-conductivity without allowing the FETs to conduct. On the next scan, an "odd" scan, another "real" row 330 is read. The odd and even scanning process continues until the x-ray detector scan area 115 has been read. FIG. 4 illustrates the interleaved scanning process.

FIG. 4 illustrates the scanning process performed by the image acquisition module 140 in step 220. Timing diagram 410 represents the traditional scanning method executed in a medical diagnostic imaging system. During each time slice 412, a row strobe 416 is activated. During a time slice 412, a row strobe 416 is activated for each row 330 in the x-ray detector scan area 115. During a time slice 412, the image acquisition module 140 reads the row 330 for which a row strobe 416 is activated.

Timing diagram 420 represents the scanning method executed in a preferred embodiment of an image acquisition module 140 in a medical diagnostic imaging system 100 used in accordance with the present invention. During every second time slice 422, a row strobe 426 is activated for each real row 330 in the x-ray detector scan area 115. During a time slice 422, the image acquisition module 140 reads the row 330 for which a row strobe 426 is activated. This row scan is a data acquisition scan and obtains exposure data for each cell 310, 510 in the row 330. The exposure data represents an x-ray dose or amount of exposure received by an associated cell 310, 510. The image acquisition module 140 obtains exposure data for each cell 310, 510 that is used to determine the intensity of a corresponding pixel on the digital image display. During each time slice 424, a new row strobe 426 is not activated. During a time slice 424, the image acquisition module 140 re-reads the current row 330, effectively measuring the charge retention (including photo-conductive charge retention) present on the data line 320 at the time slice 424. This row scan obtains photo-conductive offset data for each cell 310, 510 in the row 330.

In step 230, the image adjustment module 150 receives x-ray image data from the image acquisition module 140.

The image includes the offset correction rows interleaved between the real rows in the image scan. The image adjustment module 150 analyzes the image on a pixel by pixel basis, according to row and column. In step 240, the image adjustment module 150 calculates the image data value for a pixel 410 in the image. In a preferred embodiment, the image data value (ID) is calculated by taking the real pixel reading (exposure data value (ED)) from an odd row signal and subtracting the even row signal pixel reading (photo-conductive offset data value (PC)) from that odd row signal. The image adjustment module 150 also subtracts the charge retention offset data value (CR) for the pixel taken from the "dark" image. (The dark image may also contain offsets other than charge retention.) The "dark" image also contains "even" and "odd" row scans in order to keep timing and charge retention decay consistent. By subtracting the calibration reading from the real reading taken from the x-ray detector scan area 115, the image adjustment module 150 may correct for the photo-conductive and charge retention offsets and determine the actual pixel value ($ID_{i,j}=ED_{2i-1,j}-CR_{2i-1,j}-(PC_{2i,j}-CR_{2i,j})$). In the calculation, i represents the row 330 index into the image and j represents the column 320 index into the image. The index 2i is used because the image has both "real" rows and "phantom" correction rows. Thus, twice the number of actual rows that exist are used for pixel correction calculations. The first CR value, $CR_{2i-1,j}$, represents the charge retention offset data value from the CR value, $CR_{2i,j}$, represents the charge retention offset data value from the "phantom" rows in the "dark" image. The resulting image data values for each pixel in the image may be used to generate a digital display.

In another preferred embodiment, the photo-conductive offset data value in a digital x-ray image may be calculated by averaging two photo-conductive charge leakage measurements. In step 240, the image adjustment module 150 may calculate the image data value for a pixel by averaging the offsets data values from both the even row before and the even row after the intended odd row. The average of the readings from the even row before and the even row after the intended odd row may be subtracted from the exposure data value from the odd row to determine the actual pixel value in the image.

Thus, the present invention provides a fairly simple solution to what has become a serious degradation issue for solid state x-ray detectors. The method and apparatus for measuring and correcting the offset induced by photo-conductive FETs in a solid state x-ray detector may improve the design of new medical diagnostic imaging systems and may preserve existing medical diagnostic imaging systems through offset correction. The present invention may be easily implemented and does not necessarily require a change to existing detector hardware.

While the invention has been described with reference to a preferred embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for medical diagnostic imaging, said method comprising:

exposing a detector having rows of cells to an energy source to form an exposed image;

reading a first row of cells to obtain a first data set representing exposure data;

before reading a second row of cells, reading the first row of cells a second time to obtain a second data set representing correction data; and generating a medical diagnostic image based on said exposed image and a relation between said first and second data sets.

2. The method of claim 1 wherein said step of exposing a detector to an energy source comprises exposing said detector to x-ray energy.

3. The method of claim 1 wherein said first and second data sets comprise an exposure data set obtained from the first row of cells during a first time slice and a correction data set obtained from the first row of cells during a next consecutive time slice.

4. The method of claim 1 wherein said first data set comprises exposure data for at least a portion of a patient in the exposed image and said second data set comprises correction data for the same at least a portion of a patient in the exposed image.

5. The method of claim 1 wherein said step of generating said medical diagnostic image comprises subtracting a value from said second data set from a corresponding value in said first data set.

6. The method of claim 1 wherein said step of generating said medical diagnostic image comprises subtracting a value from said first data set from a corresponding value in said second data set.

7. The method of claim 1 wherein said step of generating a medical diagnostic image comprises activating pixels in a digital display according to said measurements in said first and second data sets.

8. The method of claim 1 wherein said second data set includes a measure of Field Effect Transistor photo-conductive effects.

9. The method of claim 1, further comprising reading the second row to obtain a third data set representing exposure data; and, before reading a third row of cells, reading the second row to obtain a fourth data set representing correction data.

10. The method of claim 1, wherein reading the first row of cells comprises measuring charge on the first row of cells to obtain exposure data and re-measuring charge on the first row of cells to obtain correction data before measuring.

11. The method of claim 1, wherein after reading the first row of cells to obtain said second data set said method comprises reading the second row of cells adjacent to the first row of cells to obtain a third data set representing exposure data.

12. A detector subsystem for acquiring an image comprising:

a panel being exposed to energy representative of an object, said panel being formed of an array of rows of cells detecting discrete amounts of energy; and a scanner reading a first row of cells to obtain a first data set representing exposure data and, before reading a second row of cells, reading said first row of cells a second time to obtain a second data set representing correction data; said scanner producing a detector output based on a relation between said first and second data sets.

13. The subsystem of claim 12 wherein said array of cells comprises:

an array of photodiodes storing charge representative of said discrete amounts of energy; and an array of Field Effect Transistors switchably interconnecting said photodiodes and said scanner.

14. The subsystem of claim 12 wherein said first and second data sets comprise an exposure data set obtained from said first row of cells during a first time slice and a correction data set obtained from said first row of cells during a next consecutive time slice.

15. The subsystem of claim 12 wherein said second data set includes Field Effect Transistor photo-conductive effects.

16. The subsystem of claim 12 wherein said scanner measures charge on said first row of cells to obtain exposure data and re-measures charge on said first row of cells to obtain correction data based on charge retained by the first row of cells before measuring charge on said second row of cells.

17. The subsystem of claim 12 wherein said second row of cells is located adjacent to said first row of cells.

18. A medical diagnostic imaging system, comprising:

a detector for detecting an energy pattern emanating from a patient; said detector having an array of discrete collecting elements storing charge representative of an amount of detected energy; and an image acquisition module measuring a charge stored on said collecting elements said image acquisition module scanning a first subset of said array of discrete collecting elements during a first pass to obtain exposure data representative of said energy pattern and, before scanning a second subset of said array of discrete collecting elements scanning said first subset of said array of discrete collecting elements during a second pass to obtain correction data representative of an energy characteristic of said detector.

19. The system of claim 18 further comprising:

an image adjustment module correcting said exposure data using said correction data to minimize the effect of said energy characteristic of said detector.

20. The system of claim 18 wherein said detector further comprises:

an array of Field Effect Transistors switchably interconnecting said collecting elements and said image acquisition module.

21. The system of claim 20 wherein said energy characteristic of said detector includes Field Effect Transistor photo-conductive effects.

22. The system of claim 18 wherein said collecting elements comprise photodiodes.

23. The system of claim 18 wherein said energy pattern is an x-ray energy pattern.

24. The system of claim 23, wherein said subset of said array of discrete collecting elements comprises a row of discrete collecting elements.

25. The system of claim 23, wherein said subset of said array of discrete collecting elements comprises a column of discrete collecting elements.

26. The system of claim 18, wherein said image acquisition module measures charge on said first subset of said array of discrete collecting elements to obtain exposure data representative of said energy pattern and, before measuring said second subset of said array of discrete collecting elements, re-measures said first subset of said array of said discrete collecting elements to obtain correction data representative of an energy characteristic of said detector.

27. The system of claim 18, wherein said second subset of said array of discrete collecting elements borders said first subset of said array of discrete collecting elements.

* * * * *